US011437016B2

(12) United States Patent
Tachibana et al.

(10) Patent No.: US 11,437,016 B2
(45) Date of Patent: Sep. 6, 2022

(54) INFORMATION PROCESSING METHOD, INFORMATION PROCESSING DEVICE, AND PROGRAM

(71) Applicant: Yamaha Corporation, Shizuoka (JP)

(72) Inventors: Makoto Tachibana, Shizuoka (JP); Motoki Ogasawara, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 0 days.

(21) Appl. No.: 17/119,371

(22) Filed: Dec. 11, 2020

(65) Prior Publication Data

US 2021/0097973 A1 Apr. 1, 2021

Related U.S. Application Data

(63) Continuation of application No. PCT/JP2019/022253, filed on Jun. 5, 2019.

(30) Foreign Application Priority Data

Jun. 15, 2018 (JP) ............................ JP2018-114605

(51) Int. Cl.
*G06F 3/16* (2006.01)
*G10L 13/033* (2013.01)
*G10L 13/027* (2013.01)

(52) U.S. Cl.
CPC .......... *G10L 13/033* (2013.01); *G10L 13/027* (2013.01)

(58) Field of Classification Search
None
See application file for complete search history.

(56) References Cited

U.S. PATENT DOCUMENTS

| | | | | |
|---|---|---|---|---|
| 6,319,130 B1 * | 11/2001 | Ooseki | G06T 15/00 463/43 |
| 9,094,576 B1 * | 7/2015 | Karakotsios | G10L 15/02 |
| 10,467,998 B2 * | 11/2019 | Silverstein | G10H 1/0025 |
| 2007/0055523 A1 * | 3/2007 | Yang | G09B 19/06 704/E21.019 |

(Continued)

FOREIGN PATENT DOCUMENTS

| | | |
|---|---|---|
| JP | 2012103654 A | 5/2012 |
| JP | 2013137520 A | 7/2013 |

(Continued)

OTHER PUBLICATIONS

International Search Report in PCT/JP2019/022253, dated Aug. 20, 2019.

(Continued)

*Primary Examiner* — Jakieda R Jackson
(74) *Attorney, Agent, or Firm* — Global IP Counselors, LLP

(57) ABSTRACT

An information processing method is realized by a computer, and includes setting a pronunciation style with regard to a specific range on a time axis, arranging one or more notes in accordance with an instruction from a user within the specific range for which the pronunciation style has been set, and generating a characteristic transition, which is a transition of acoustic characteristics of voice that pronounces the one or more notes within the specific range in the pronunciation style set for the specific range.

17 Claims, 5 Drawing Sheets

(56) References Cited

U.S. PATENT DOCUMENTS

| | | | | |
|---|---|---|---|---|
| 2008/0091571 | A1* | 4/2008 | Safer | G10H 1/0058 705/26.5 |
| 2009/0306987 | A1* | 12/2009 | Nakano | G10H 1/366 704/E13.011 |
| 2012/0031257 | A1* | 2/2012 | Saino | G10H 5/005 84/622 |
| 2013/0112062 | A1* | 5/2013 | Iriyama | G10H 1/0008 84/453 |
| 2013/0125732 | A1* | 5/2013 | Nguyen | G10H 1/0025 84/609 |
| 2014/0236597 | A1* | 8/2014 | Ben Ezra | G10L 13/06 704/235 |
| 2015/0040743 | A1* | 2/2015 | Tachibana | G10H 7/02 84/622 |
| 2016/0027420 | A1* | 1/2016 | Eronen | G10H 1/40 84/611 |
| 2016/0173982 | A1* | 6/2016 | Anderson | G10H 1/46 381/119 |
| 2017/0140745 | A1* | 5/2017 | Nayak | G10H 1/366 |

FOREIGN PATENT DOCUMENTS

| | | | |
|---|---|---|---|
| JP | 2015034920 | A | 2/2015 |
| JP | 2015049253 | A | 3/2015 |
| JP | 2017097176 | A | 6/2017 |
| JP | 2017107228 | A | 6/2017 |

OTHER PUBLICATIONS

An Office Action in the corresponding Japanese Patent Application No. 2020-525475, dated Dec. 24, 2021.

* cited by examiner

INFORMATION PROCESSING METHOD, INFORMATION PROCESSING DEVICE, AND PROGRAM

CROSS-REFERENCE TO RELATED APPLICATIONS

This application is a continuation application of International Application No. PCT/JP2019/022253, filed on Jun. 5, 2019, which claims priority to Japanese Patent Application No. 2018-114605 filed in Japan on Jun. 15, 2018. The entire disclosures of International Application No. PCT/JP2019/022253 and Japanese Patent Application No. 2018-114605 are hereby incorporated herein by reference.

BACKGROUND

Technological Field

The present invention relates to a technique for synthesizing voice.

Background Information

Voice synthesis technology for synthesizing voice that pronounces a note designated by a user has been proposed in known art. For example, Japanese Laid-Open Patent Application No. 2015-34920 discloses a technique in which the transition of the pitch that reflects the expression peculiar to a particular singer is set by means of a transition estimation model, such as HMM (Hidden Markov Model), to synthesize a singing voice that follows the transitions of pitch.

SUMMARY

An object of the present disclosure is to reduce the workload of designating a pronunciation style to be given to synthesized voice.

According to the present disclosure, an information processing method according to one aspect of the present disclosure comprises setting a pronunciation style with regard to a specific range on a time axis, arranging notes in accordance with an instruction from a user within the specific range for which the pronunciation style has been set, and generating a characteristic transition, which is a transition of acoustic characteristics of voice that pronounces a note within the specific range in the pronunciation style set for the specific range.

An information processing device according to one aspect of the present disclosure comprises an electronic controller including at least one processor, and the electronic controller is configured to execute a plurality of modules including a range setting module that sets a pronunciation style with regard to a specific range on a time axis, a note processing module that arranges notes in accordance with an instruction from a user within the specific range for which the pronunciation style has been set, and a transition generation module that generates a characteristic transition, which is a transition of acoustic characteristics of voice that pronounces a note within the specific range in the pronunciation style set for the specific range.

A non-transitory computer-readable medium storing a program according to one aspect of the present disclosure causes a computer to execute a process that includes setting a pronunciation style with regard to a specific range on a time axis, arranging a note in accordance with an instruction from a user within the specific range for which the pronunciation style has been set, and generating a characteristic transition, which is a transition of acoustic characteristics of voice that pronounces the note within the specific range in the pronunciation style set for the specific range.

DETAILED DESCRIPTION OF THE EMBODIMENTS

In the conventional voice synthesis scenario, a user designates a desired expression that should be given to each note, while sequentially designating time series of the notes. However, there is the problem that re-designating the expression each time the user edits a note is tedious. Selected embodiments to solve such a problem will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

First Embodiment

Figure 1:
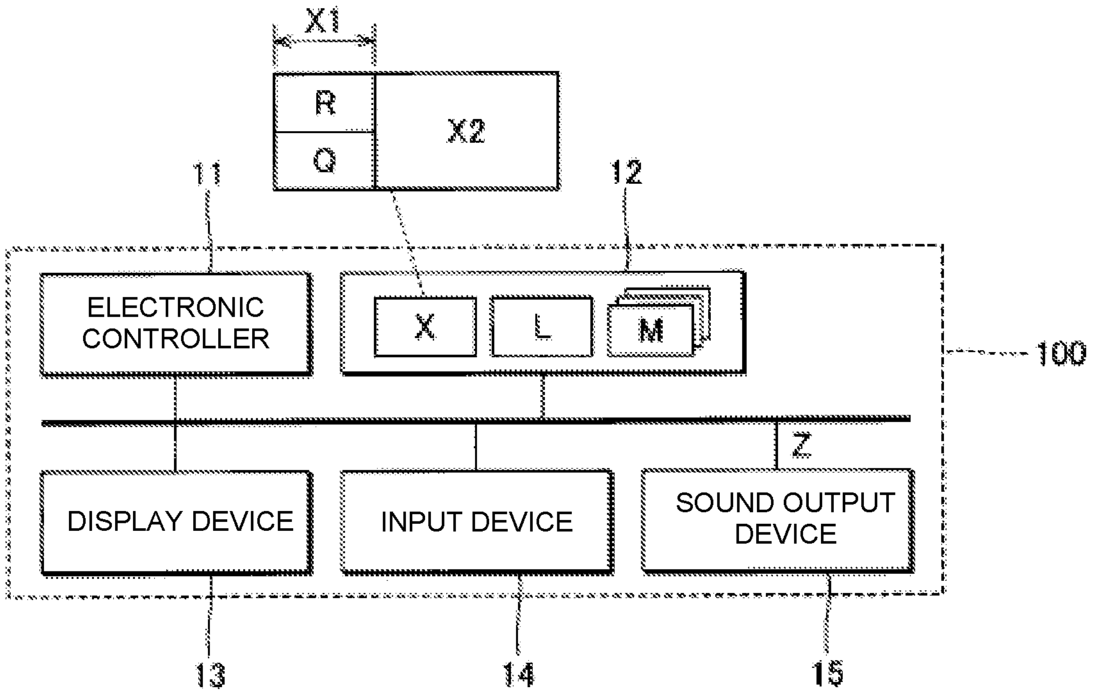
FIG. 1 is a block diagram illustrating a configuration of an information processing device according to a first embodiment.

FIG. 1 is a block diagram illustrating a configuration of an information processing device 100 according to a first embodiment. The information processing device 100 is a voice synthesizing device that generates voice (hereinafter referred to as "synthesized voice") in which a singer virtually sings a musical piece (hereinafter referred to as "synthesized musical piece"). The information processing device 100 according to the first embodiment generates synthesized voice that is virtually pronounced in a pronunciation style selected from a plurality of pronunciation styles. A pronunciation style means, for example, a characteristic manner of pronunciation. Specifically, a characteristic related to a temporal change of a feature amount, such as pitch or volume (that is, the pattern of change of the feature amount), is one example of a pronunciation style. For example, the manner of singing suitable for various genres of music, such as rap, R&B (rhythm and blues), and punk, is one example of a pronunciation style.

As shown in FIG. 1, the information processing device 100 according to the first embodiment is realized by a computer system comprising an electronic controller (control device) 11, a storage device 12, a display device 13, an input device 14, and a sound output device 15. For example, a portable information terminal such as a mobile phone or a smartphone, or a portable or stationary information terminal such as a personal computer, can be used as the information processing device 100. The electronic controller 11 includes one or more processors such as a CPU (Central Processing Unit) and executes various calculation processes and control processes. The term "electronic controller" as used herein refers to hardware that executes software programs.

The storage device 12 is one or more memories including a known storage medium such as a magnetic storage medium or a semiconductor storage medium, which stores a program that is executed by the electronic controller 11 and various data that are used by the electronic controller 11. In other words, the storage device 12 is any computer storage device or any computer readable medium with the sole exception of a transitory, propagating signal. The storage device 12 can be a combination of a plurality of types of storage media. Moreover, a storage device 12 that is separate from the information processing device 100 (for example, cloud storage) can be provided, and the electronic controller 11 can read from or write to the storage device 12 via a communication network. That is, the storage device 12 may be omitted from the information processing device 100.

The storage device 12 of the first embodiment stores synthesis data X, voice element group L, and a plurality of transition estimation models M. The synthesis data X designate the content of voice synthesis. As shown in FIG. 1, the synthesis data X include range data X1 and musical score data X2. The range data X1 are data designating a prescribed range (hereinafter referred to as "specific range") R within a synthesized musical piece and a pronunciation style Q within said specific range R. The specific range R is designated by, for example, a start time and an end time. A single specific range or a plurality of specific ranges R are set in one synthesized musical piece.

The musical score data X2 is a music file specifying a time series of a plurality of notes constituting the synthesized musical piece. The musical score data X2 specify a pitch, a phoneme (pronunciation character), and a pronunciation period for each of a plurality of notes constituting the synthesized musical piece. The musical score data X2 can also specify a numerical value of a control parameter, such as volume (velocity), relating to each note. For example, a file in a format conforming to the MIDI (Musical Instrument Digital Interface) standard (SMF: Standard MIDI File) can be used as the musical score data X2.

The voice element group L is a voice synthesis library including a plurality of voice elements. Each voice element is a phoneme unit (for example, a vowel or a consonant), which is the smallest unit of linguistic significance, or a phoneme chain in which a plurality of phonemes are connected. Each voice element is represented by the sample sequence of a time-domain voice waveform or of a time series of the frequency spectrum corresponding to the voice waveform. Each voice element is collected in advance from recorded voice of a specific speaker, for example.

The storage device 12 according to the first embodiment stores a plurality of transition estimation models M corresponding to different pronunciation styles. The transition estimation model M corresponding to each pronunciation style is a probability model for generating the transition of the pitch of the voice (hereinafter referred to as "characteristic transition") pronounced in said pronunciation style. That is, the characteristic transition of the first embodiment is a pitch curve expressed as a time series of a plurality of pitches. The pitch represented by the characteristic transition is a relative value with respect to a prescribed reference value (for example, the pitch corresponding to a note), for example, and is expressed in cents, for example.

The transition estimation model M of each pronunciation style is generated in advance by means of machine learning that utilizes numerous pieces of learning data corresponding to said pronunciation style. Specifically, it is a generative model obtained through machine learning in which the numerical value at each point in time in the transition of the acoustic characteristic represented by the learning data is associated with the context at said point in time (for example, the pitch, intensity, and duration of a note). For example, a recursive probability model that estimates the current transition from the history of past transitions is utilized as the transition estimation model M. By applying the transition estimation model M of an arbitrary pronunciation style Q to the musical score data X2, a characteristic transition of a voice pronouncing the note specified by the musical score data X2 in the pronunciation style Q is generated. In a characteristic transition generated by the transition estimation model M of each pronunciation style Q, changes in pitch unique to said pronunciation style Q can be observed. As described above, because the characteristic transition is generated using the transition estimation model M learned by means of machine learning, it is possible to generate the characteristic transition reflecting underlying trends in the learning data utilized for the machine learning.

The display device 13 is a display including, for example, a liquid-crystal display panel or an organic electroluminescent display panel. The display device 13 displays an image instructed by the electronic controller 11. The input device 14 is an input device (user operable input) that receives instructions from a user. Specifically, at least one operator, for example, a button, a switch, a lever, and/or a dial, that can be operated by the user, and/or a touch panel that detects contact with the display surface of the display device 13, are/is used as the input device 14. The sound output device 15 (for example, a speaker or headphones) emits synthesized voice.

Figure 2:
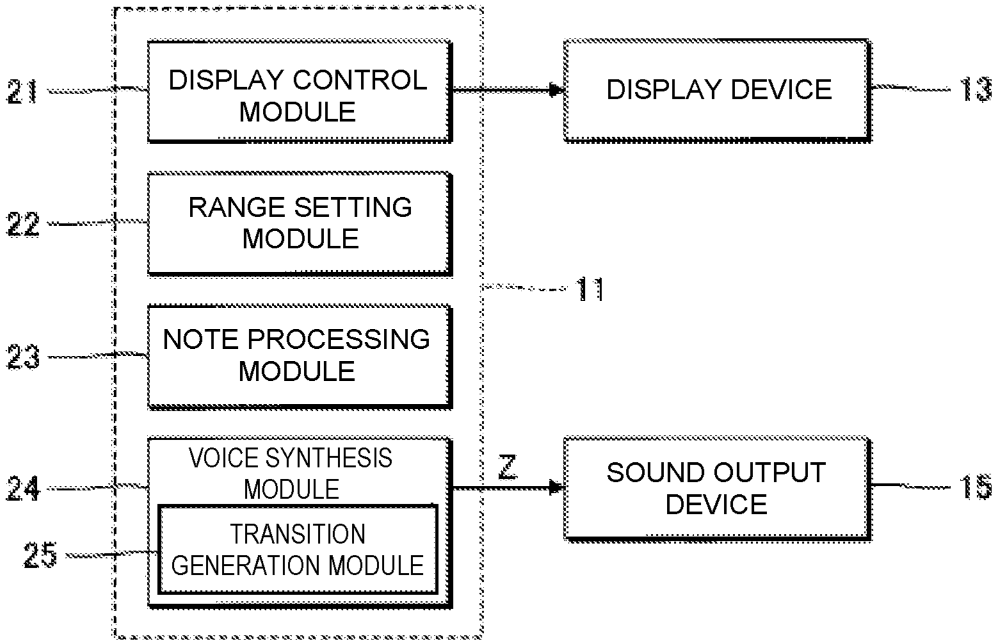
FIG. 2 is a block diagram illustrating a functional configuration of the information processing device.

FIG. 2 is a block diagram showing the functional configuration of the electronic controller 11. As shown in FIG. 2, the electronic controller 11 includes a display control module (display control unit) 21, a range setting module (range setting unit) 22, a note processing module (note processing unit) 23, and a voice synthesis module (voice synthesis unit) 24. More specifically, the electronic controller 11 executes a program stored in the storage device 12 in order to realize (execute) a plurality of modules (functions) including the display control module 21, the range setting module 22, the note processing module 23, and the voice synthesis module 24, for generating a voice signal Z representing the synthesized voice. Moreover, the functions of the electronic controller 11 can be realized by a plurality of devices configured separately from each other, or some or all of the functions of the electronic controller 11 can be realized by a dedicated electronic circuit.

The display control module 21 causes the display device 13 to display various images. The display control module 21 according to the first embodiment causes the display device 13 to display the editing image G of FIG. 3. The editing image G is an image representing the content of the synthesis data X and includes a coordinate plane (hereinafter referred to as "musical score area") C in which a horizontal time axis and a vertical pitch axis are set.

Figure 3:
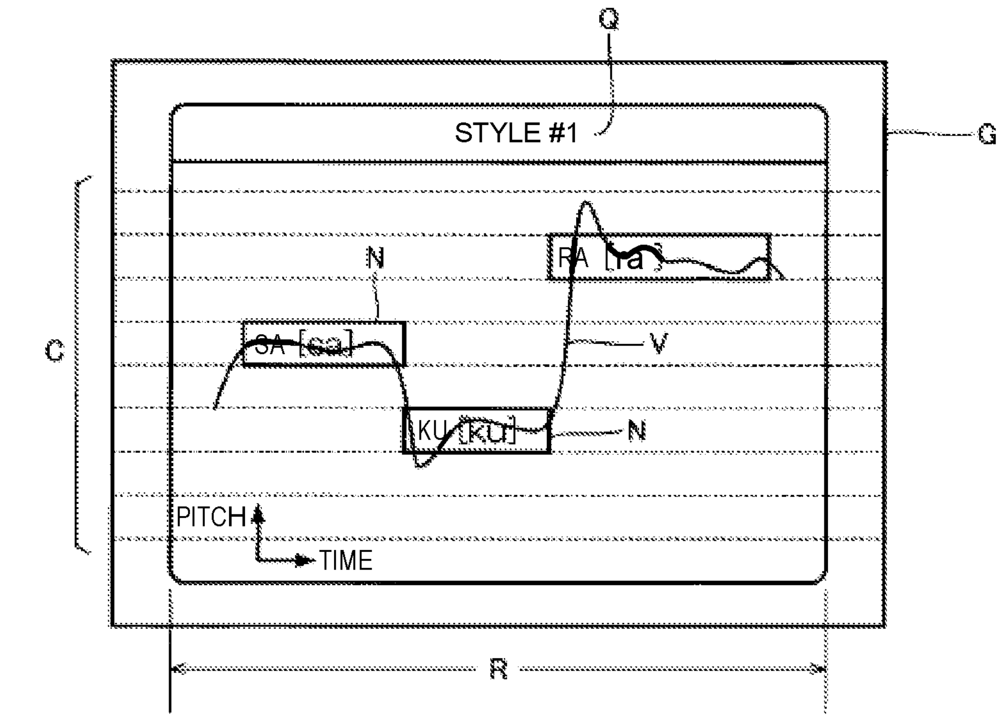
FIG. 3 is a schematic diagram of an editing image.

As shown in FIG. 3, the display control module 21 causes the display device 13 to display the name of the pronunciation style Q and the specific range R designated by range data X1 of the synthesis data X. The specific range R is represented by a specified range of the time axis in the musical score area C. In addition, the display control module 21 causes the display device 13 to display a musical note figure N representing the musical note designated by the musical score data X2 of the synthesis data X. The note figure N is an essentially rectangular figure (so-called note bar) in which phonemes are arranged. The position of the note figure N in the pitch axis direction is set in accordance with the pitch designated by the musical score data X2. The end points of the note figure N in the time axis direction are set in accordance with the pronunciation period designated by the musical score data X2. In addition, the display control module 21 causes the display device 13 to display a characteristic transition V generated by the transition estimation model M.

The range setting module 22 of FIG. 2 sets the pronunciation style Q for the specific range R within the synthesized musical piece. By appropriately operating the input device 14, the user can instruct an addition or change of the specific range R and the pronunciation style Q of the specific range R. The range setting module 22 adds or changes the specific range R and sets the pronunciation style Q of the specific range R in accordance with the user's instruction and changes the range data X1 in accordance with said setting. Further, the display control module 21 causes the display device 13 to display the name of the pronunciation style Q and the specific range R designated by the range data X1 after the change. If the specific range R is added, the pronunciation style Q of the specific range R can be set to the initial value, and the pronunciation style Q of the specific range R can be changed in accordance with the user's instruction.

The note processing module 23 arranges at least one or more notes within the specific range R for which the pronunciation style Q has been set in accordance with the user's instruction. By appropriately operating the input device 14, the user can instruct the editing (for example, adding, changing, or deleting) of a note inside the specific range R. The note processing module 23 changes the musical score data X2 in accordance with the user's instruction. In addition, the display control module 21 causes the display device 13 to display a note figure N corresponding to each note designated by the musical score data X2 after the change.

The voice synthesis module 24 generates the voice signal Z of the synthesized voice designated by the synthesis data X. The voice synthesis module 24 according to the first embodiment generates the voice signal Z by means of concatenative voice synthesis. Specifically, the voice synthesis module 24 sequentially selects from the voice element group L the voice element corresponding to the phoneme of each note designated by the musical score data X2, adjusts the pitch and the pronunciation period of each voice element in accordance with the musical score data X2, and connects the voice elements to each other in order to generate the voice signal Z.

The voice synthesis module 24 according to the first embodiment includes a transition generation module (transition generation unit) 25. The transition generation module 25 generates the characteristic transition V for each specific range R. The characteristic transition V of each specific range R is the transition of the acoustic characteristic (specifically, pitch) of the voice pronouncing one or more notes within the specific range R in the pronunciation style Q set for the specific range R. The voice synthesis module 24 generates the voice signal Z of the synthesized voice whose pitch changes along the characteristic transition V generated by the transition generation module 25. That is, the pitch of the voice element selected in accordance with the phoneme of each note is adjusted to follow the characteristic transition V. The display control module 21 causes the display device 13 to display the characteristic transition V generated by the transition generation module 25. As can be understood from the description above, the note figure N of the notes within the specific range R and the characteristic transition V within the specific range R are displayed within the musical score area C in which the time axis is set.

Figure 4:
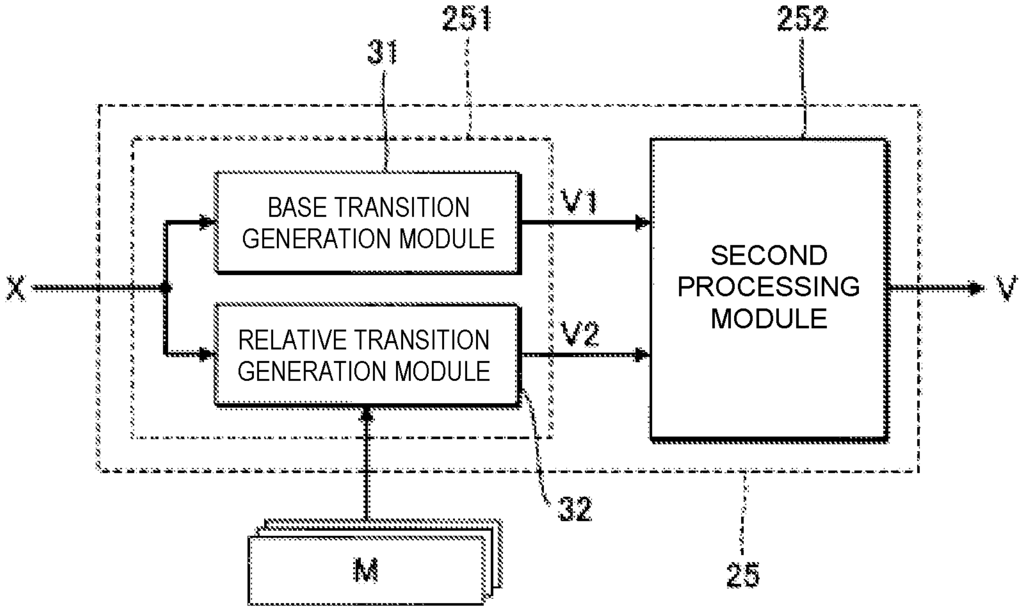
FIG. 4 is a block diagram illustrating a configuration of a transition generation module.

FIG. 4 is a block diagram illustrating a configuration of the transition generation module 25 according to the first embodiment. As shown in FIG. 4, the transition generation module 25 of the first embodiment includes a first processing module (first processing unit) 251 and a second processing module (second processing unit) 252. The first processing module 251 generates basic transition (base transition V1 and relative transition V2) of the acoustic characteristics of the synthesized voice from the synthesis data X.

Specifically, the first processing module 251 includes a base transition generation module (base transition generation unit) 31 and a relative transition generation module (relative transition generation unit) 32. The base transition generation module 31 generates the base transition V1 corresponding to the pitch specified by the synthesis data X for each note. The base transition V1 is the basic transition of the acoustic characteristics in which the pitch smoothly transitions between successive notes. The relative transition generation module 32, on the other hand, generates the relative transition V2 from the synthesis data X. The relative transition V2 is the transition of the relative value of the pitch relative to the base transition V1 (that is, the relative pitch, which is the difference in pitch from the base transition V1). The transition estimation model M is used for generating the relative transition V2. Specifically, the relative transition generation module 32 selects from among the plurality of transition estimation models M the transition estimation model M that is in the pronunciation style Q set for the specific range R, and applies the transition estimation model M to the part of the musical score data X2 within the specific range R in order to generate the relative transition V2.

The second processing module 252 generates the characteristic transition V from the base transition V1 generated by the base transition generation module 31 and the relative transition V2 generated by the relative transition generation module 32. Specifically, the second processing module 252 adjusts the base transition V1 or the relative transition V2 in accordance with the time length of the voiced sound and unvoiced sound in each voice element selected in accordance with the phoneme of each note, or in accordance with control parameters, such as the volume of each note, in order to generate the characteristic transition V. The information reflected in the adjustment of the base transition V1 or the relative transition V2 is not limited to the example described above.

Figure 5:
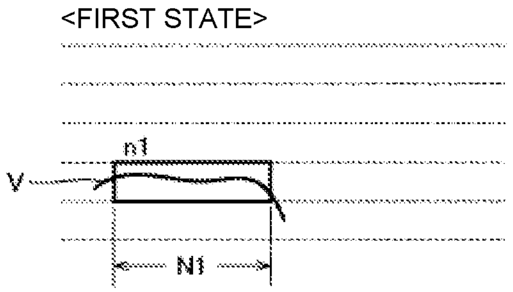
FIG. 5 is an explanatory diagram of the relationship between a note and a characteristic transition.

The relationship between the notes and the characteristic transition V generated by the transition generation module 25 will be described. FIG. 5 illustrates a first state in which a first note n1 (note figure N1) is set within the specific range R, and FIG. 6 illustrates a second state in which a second note n2 (note figure N2) is added to the specific range R in the first state.

Figure 6:
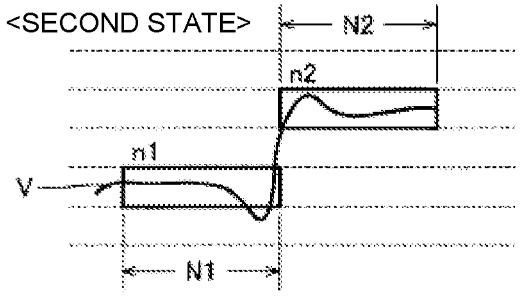
FIG. 6 is an explanatory diagram of the relationship between notes and a characteristic transition.

As can be understood from FIGS. 5 and 6, the characteristic transition V is different between the first state and the second state, not only in the section corresponding to the newly added second note n2, but also the part corresponding to the first note n1. That is, the shape of the part of the characteristic transition V corresponding to the first note n1 changes in accordance with the presence/absence of the second note n2 in the specific range R. For example, when a transition is made from the first state to the second state due to the addition of the second note n2, the characteristic transition V changes from a shape that decreases at the end point of the first note n1 (the shape in the first state) to a shape that rises from the first note n1 to the second note n2 (the shape in the second state).

As described above, in the first embodiment, the part of the characteristic transition V corresponding to the first note n1 changes in accordance with the presence/absence of the second note n2 in the specific range R. Therefore, it is possible to generate a natural characteristic transition V that reflects the tendency to be affected by not only individual notes but also the relationship between surrounding notes.

Figure 7:
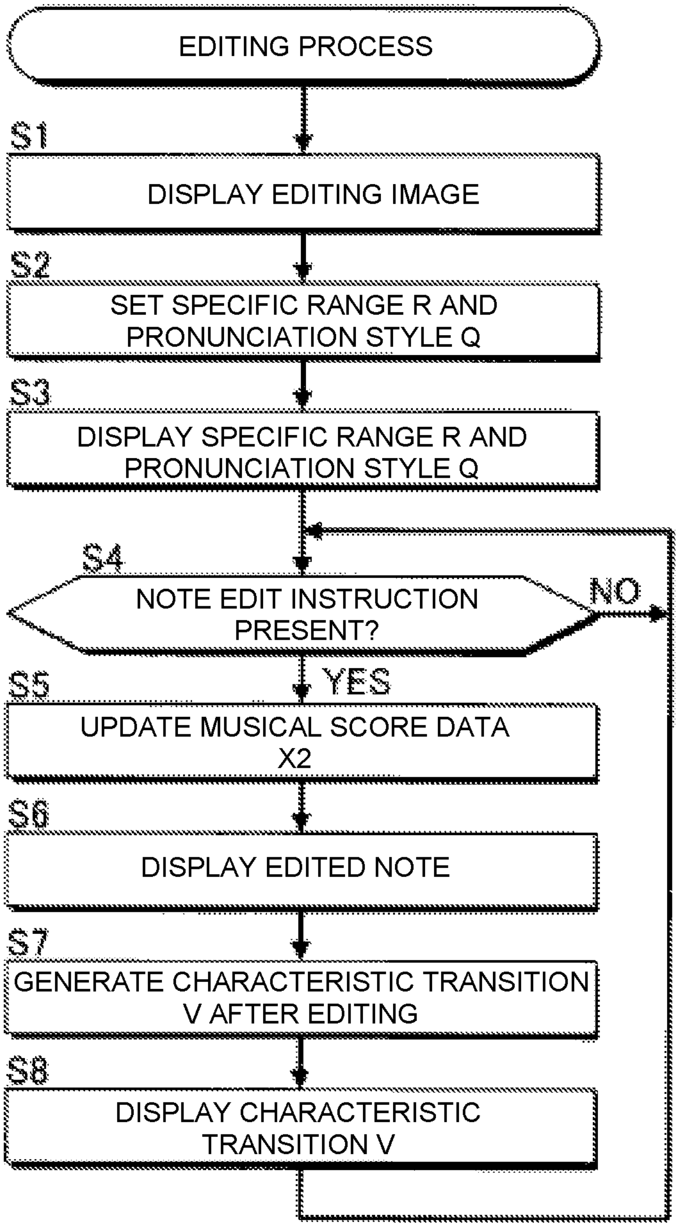
FIG. 7 is a flowchart illustrating a process executed by an electronic controller.

FIG. 7 is a flowchart illustrating the specific procedure of a process (hereinafter referred to as "editing process") that is executed by the electronic controller 11 of the first embodiment. For example, the editing process of FIG. 7 is started in response to an instruction from the user to the input device 14.

When the editing process is started, the display control module 21 causes the display device 13 to display an initial editing image G in which the specific range R and the notes are not set in the musical score area C. The range setting module 22 sets the specific range R in the musical score area C and the pronunciation style Q of the specific range R in accordance with the user's instruction (S2). That is, the pronunciation style Q of the specific range R is set before the notes of the synthesized musical piece are set. The display control module 21 causes the display device 13 to display the specific range R and the pronunciation style Q (S3).

The user can instruct the editing of the notes within the specific range R set according to the procedure described above. The electronic controller 11 stands by until the instruction to edit the notes is received from the user (S4: NO). When the instruction to edit is received from the user (S4: YES), the note processing module 23 edits the notes in the specific range R in accordance with the instruction (S5). For example, the note processing module 23 edits the notes (add, change, or delete), and changes the musical score data X2 in accordance with the result of the edit. As a result of adding notes within the specific range R for which the pronunciation style Q is set, the pronunciation style Q is also applied to said notes. The display control module 21 causes the display device 13 to display the edited notes within the specific range R (S6).

The transition generation module 25 generates the characteristic transition V of the case in which notes within the specific range R are pronounced in the pronunciation style Q set for the specific range R (S7). That is, the characteristic transition V of the specific range R is changed each time a note within the specific range R is edited. The display control module 21 causes the display device 13 to display the characteristic transition V that is generated by the transition generation module 25 (S8). As can be understood from the foregoing explanation, the generation of the characteristic transition V of the specific range R (S7) and the display of the characteristic transition V (S8) are executed each time a note within the specific range R is edited. Therefore, the user can confirm the characteristic transition V corresponding to the edited note each time a note is edited (for example, added, changed, or deleted).

As described above, in the first embodiment, notes are arranged in the specific range R for which the pronunciation style Q is set, and the characteristic transition V of the voice pronouncing the notes within the specific range R in the pronunciation style Q set for the specific range R is generated. Therefore, when the user instructs to edit a note, the pronunciation style Q is automatically set for the edited note. That is, according to the first embodiment, it is possible to reduce the workload of the user specifying the pronunciation style Q of each note.

In addition, in the first embodiment, the note figure N of the note within the specific range R and the characteristic transition V of the specific range R are displayed within the musical score area C. Therefore, there is also the advantage that the user can visually ascertain the temporal relationship between the notes in the specific range R and the characteristic transition V.

Second Embodiment

The second embodiment will be described. In each of the examples below, elements that have the same functions as those in the first embodiment have been assigned the same reference symbols as those used to describe the first embodiment, and detailed descriptions thereof have been appropriately omitted.

In the first embodiment, the relative transition V2 of the pronunciation style Q is generated using the transition estimation model M of the pronunciation style Q set by the user. The transition generation module 25 according to the second embodiment generates the relative transition V2 (and thus the characteristic transition V) using an expression sample prepared in advance.

The storage device 12 of the second embodiment stores a plurality of expression samples respectively corresponding to a plurality of pronunciation expressions. The expression sample of each pronunciation expression is a time series of a plurality of samples representing the transition of the pitch (specifically, the relative value) of the voice that is pronounced by means of said pronunciation expression. A plurality of expression samples corresponding to different conditions (context) are stored in the storage device 12 for each pronunciation style Q.

The transition generation module 25 according to the second embodiment selects an expression sample by means of an expression selection model corresponding to the pronunciation style Q set for the specific range R and generates the relative transition V2 (and thus the characteristic transition V) using said expression sample. The expression selection model is a classification model obtained by carrying out machine-learning by associating the pronunciation style Q and the context with the trend of selection of the expression sample applied to the musical notes specified by the musical score data X2. For example, an operator versed in various pronunciation expressions selects an expression sample appropriate for a particular pronunciation style Q and context, and learning data in which the musical score data X2 representing said context and the expression sample selected by the operator are associated are used for the machine learning in order to generate the expression selection model for each pronunciation style Q. The expression selection model for each pronunciation style Q is stored in the storage device 12. Whether a particular expression sample is applied to one note affects not only the characteristics (pitch or duration) of the note, but also the characteristic of the notes before and after the note, or the expression sample applied to the notes before and after.

The relative transition generation module 32 according to the second embodiment uses the expression selection model corresponding to the pronunciation style Q of the specific range R to select the expression sample in Step S7 of the editing process (FIG. 7). Specifically, the relative transition generation module 32 uses the expression selection model to select the note to which the expression sample is applied from among the plurality of notes specified by the musical score data X2, and the expression sample to be applied to said note. The relative transition generation module 32 applies the transition of the pitch of the selected expression sample to said note in order to generate the relative transition V2. In the same manner as the first embodiment, the second processing module 252 generates the characteristic transition V from the base transition V1 generated by the base transition generation module 31 and the relative transition V2 generated by the relative transition generation module 32.

As can be understood from the foregoing explanation, the transition generation module 25 of the second embodiment generates the characteristic transition V from the transition of the pitch of the expression sample selected in accordance with the pronunciation style Q for each note within the specific range R. The display of the characteristic transition V generated by the transition generation module 25 and the generation of the voice signal Z utilizing the characteristic transition V are the same as in the first embodiment.

The same effects as those of the first embodiment are realized in the second embodiment. In addition, in the second embodiment, since the characteristic transition V within the specific range R is generated in accordance with the transition of the pitch of the selected expression sample having the trend corresponding to the pronunciation style Q, it is possible to generate a characteristic transition V that faithfully reflects the trend of the transition of the pitch in the expression sample.

Third Embodiment

In the third embodiment, an adjustment parameter P is applied to the generation of the characteristic transition V by the transition generation module 25. The numerical value of the adjustment parameter P is variably set in accordance with the user's instruction to the input device 14. The adjustment parameter P of the third embodiment includes a first parameter P1 and a second parameter P2. The transition generation module 25 sets the numerical value of each of the first parameter P1 and the second parameter P2 in accordance with the user's instruction. The first parameter P1 and the second parameter P2 are set for each of the specific range R.

The transition generation module 25 (specifically, the second processing module 252) controls the minute fluctuations in the relative transition V2 of each of the specific range R in accordance with the numerical value of the first parameter P1 set for the specific range R. For example, high-frequency components (that is, temporally unstable and minute fluctuation components) of the relative transition V2 are controlled in accordance with the first parameter P1. Singing voice in which minute fluctuations are suppressed gives the listener the impression of a talented singer. Accordingly, the first parameter P1 corresponds to a parameter relating to the singing skill expressed by the synthesized voice.

In addition, the transition generation module 25 controls the pitch fluctuation range in the relative transition V2 in each of the specific range R in accordance with the numerical value of the second parameter P2 set for the specific range R. The pitch fluctuation range affects the intonations of the synthesized voice that the listener perceives. That is, the greater the pitch fluctuation range, the greater will be the listener's perception of the intonations of the synthesized voice. Accordingly, the second parameter P2 corresponds to a parameter relating to the intonation of the synthesized voice. The display of the characteristic transition V generated by the transition generation module 25 and the generation of the voice signal Z utilizing the characteristic transition V are the same as in the first embodiment.

The same effect as the first embodiment is realized in the third embodiment. In addition, according to the third embodiment, it is possible to generate various characteristic transitions V in accordance with the adjustment parameter P set in accordance with the user's instruction.

In the foregoing explanation, the adjustment parameter P is set for the specific range R, but the range of setting the adjustment parameter P is not limited to the example described above. Specifically, the adjustment parameter P can be set for the entire synthesized musical piece, or the adjustment parameter P can be adjusted for each note. For example, the first parameter P1 can be set for the entire synthesized musical piece, and the second parameter P2 can be set for the entire synthesized musical piece or for each note.

Modified Examples

Specific modified embodiments to be added to each of the embodiments as exemplified above are illustrated in the following. Two or more embodiments arbitrarily selected from the following examples can be appropriately combined as long as they are not mutually contradictory.

(1) In the embodiments described above, the voice element group L of one type of tone is used for voice synthesis, but a plurality of voice element groups L can be selectively used for voice synthesis. The plurality of voice element groups L include voice elements extracted from the voices of different speakers. That is, the tone of each voice element is different for each voice element group L. The voice synthesis module 24 generates the voice signal Z by means of voice synthesis utilizing the voice element group L selected from among the plurality of voice element groups L in accordance with the user's instruction. That is, the voice signal Z is generated so as to represent the synthesized voice having the tone which, among a plurality of tones, corresponds to an instruction from the user. According to the configuration described above, it is possible to generate a synthesized voice having various tones. The voice element group L can be selected for each section in the synthesized musical piece (for example, for each specific range R).

(2) In the embodiments described above, the characteristic transition V over the entire specific range R is changed each time a note is edited, but a portion of the characteristic transition V can be changed instead. That is, the transition generation module 25 changes a specific range (hereinafter referred to as "change range") of the characteristic transition V of the specific range R including the note to be edited. The change range is, for example, a range which includes a continuous sequence of notes that precede and follow the notes to be edited are (for example, a period corresponding to one phrase of the synthesized musical piece). By means of the configuration described above, it is possible to reduce the processing load of the transition generation module 25 compared with a configuration in which the characteristic transition V is generated over the entire specific range R each time a note is edited.

(3) There are cases in which, after the first note n1 is added in the musical score area C, the user gives an instruction to edit a different second note n2, before completion of the process for the transition generation module 25 to generate the characteristic transition V corresponding to the time series of the added note. In the case described above, the intermediate result of the generation of the characteristic transition V corresponding to the addition of the first note n1 is discarded, and the transition generation module 25 generates the characteristic transition V corresponding to the time series of the notes including the first note n1 and the second note n2.

Figure 8:
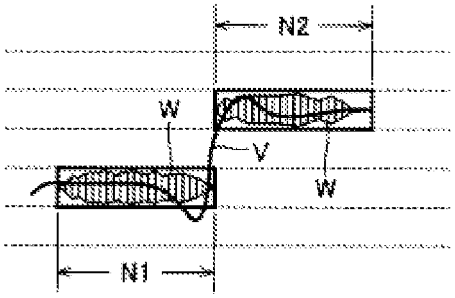
FIG. 8 is a schematic diagram of an editing image in a modified example.

(4) In the embodiments described above, the note figure N corresponding to each note of the synthesized musical piece is displayed in the musical score area C, but an audio waveform represented by the voice signal Z can be arranged in the musical score area C together with the note figure N (or instead of the note figure N). For example, as shown in FIG. 8, an audio waveform W of the portion of the voice signal Z corresponding to the note is displayed so as to overlap the note figure N of each note.

(5) In the embodiments described above, the characteristic transition V is displayed in the musical score area C, but the base transition V1 and/or the relative transition V2 can be displayed on the display device 13 in addition to the characteristic transition V (or instead of the characteristic transition V). The base transition V1 or the relative transition V2 is displayed in a display mode that is different from that of the characteristic transition V (that is, in a visually distinguishable image form). Specifically, the base transition V1 or the relative transition V2 is displayed using a different color or line type than those of the characteristic transition V. Since the relative transition V2 is the relative value of pitch, instead of being displayed in the musical score area C, it can be displayed in a different area in which the same time axis as the musical score area C is set.

(6) In the embodiments described above, the transition of the pitch of the synthesized voice is illustrated as an example of the characteristic transition V, but the acoustic characteristic represented by the characteristic transition V is not limited to pitch. For example, the volume of the synthesized voice can be generated by the transition generation module 25 as the characteristic transition V.

(7) In the embodiments described above, the voice synthesizing device that generates the synthesized voice is illustrated as an example of the information processing device 100, but the generation of the synthesized voice is not essential. For example, the information processing device 100 can also be realized as a characteristic transition generation device that generates the characteristic transition V relating to each of the specific range R. In the characteristic transition generation device, the presence/absence of a function for generating the voice signal Z of the synthesized voice (voice synthesis module 24) does not matter.

(8) The function of the information processing device 100 according to the embodiments described above is realized by cooperation between a computer (for example, the electronic controller 11) and a program. A program according to one aspect of the present disclosure causes a computer to function as the range setting module 22 for setting the pronunciation style Q with regard to the specific range R on a time axis, the note processing module 23 for arranging notes in accordance with an instruction from the user within the specific range R for which the pronunciation style Q has been set, and the transition generation module 25 for generating the characteristic transition V, which is the transition of acoustic characteristics of voice that pronounces the note within the specific range R in the pronunciation style Q set for the specific range R.

The program as exemplified above can be stored on a computer-readable storage medium and installed in a computer. The storage medium, for example, is a non-transitory storage medium, a good example of which is an optical storage medium (optical disc) such as a CD-ROM, but can include storage media of any known format, such as a semiconductor storage medium or a magnetic storage medium. Non-transitory storage media include any storage medium that excludes transitory propagating signals and does not exclude volatile storage media. Furthermore, the program can be delivered to a computer in the form of distribution via a communication network.

Aspects

For example, the following configurations may be understood from the embodiments as exemplified above.

An information processing method according to one aspect (first aspect) of the present disclosure comprises setting a pronunciation style with regard to a specific range on a time axis, arranging one or more notes in accordance with an instruction from a user within the specific range for which the pronunciation style has been set, and generating a characteristic transition, which is the transition of acoustic characteristics of voice that pronounces the one or more notes within the specific range in the pronunciation style set for the specific range. By means of the aspect described above, one or more notes are set within the specific range for which the pronunciation style is set, and the characteristic transition of the voice pronouncing one or more notes within said specific range in the pronunciation style set for the specific range is generated. Therefore, it is possible to reduce the workload of the user specifying the pronunciation style of each note.

In one example (second aspect) of the first aspect, the one or more notes within the specific range and the characteristic transition in the specific range are displayed within the musical score area in which the time axis is set. By means of the aspect described above, the user can visually ascertain the temporal relationship between the one or more notes in the specific range and the characteristic transition.

In one example (third aspect) of the first aspect or the second aspect, the characteristic transition of the specific range is changed each the time one or more notes within the specific range are edited. By means of the aspect described above, it is possible to confirm the characteristic transition corresponding to the edited one or more notes each time one or more notes are edited (for example, added or changed).

In one example (fourth aspect) of any one of the first to the third aspects, the one or more notes include a first note and a second note, and a portion corresponding the first note is different between the characteristic transition in a first state in which the first note is set within the specific range, and the characteristic transition in a second state in which the second note has been added to the specific range in the first state. By means of the aspect described above, the part of the characteristic transition corresponding to the first note changes in accordance with the presence/absence of the second note in the specific range. Therefore, it is possible to generate a natural characteristic transition reflecting the tendency to be affected by not only individual notes but also the relationship between the surrounding notes.

In one example (fifth aspect) of any one of the first to the fourth aspects, in the generation of the characteristic transition, the transition estimation model corresponding to the pronunciation style set for the specific range from among the plurality of transition estimation models corresponding to different pronunciation styles is used to generate the characteristic transition. By means of the aspect described above, because the characteristic transition is generated using the transition estimation model learned by means of machine learning, it is possible to generate the characteristic transition reflecting underlying trends in the learning data utilized for machine learning.

In one example (sixth aspect) of any one of the first to the fourth aspects, in the generation of the characteristic transition, the characteristic transition is generated in accordance with the transition of the characteristic of the expression sample corresponding to the one or more notes within the specific range from among the plurality of expression samples representing voice. By means of the aspect described above, because the characteristic transition in the specific range is generated in accordance with the transition of the characteristic of the expression sample, it is possible to generate the characteristic transition that faithfully reflects the tendency of the transition of the characteristic transition in the expression sample.

In one example (seventh aspect) of any one of the first to the fourth aspects, in the generation of the characteristic transition, an expression selection model corresponding to the pronunciation style set for the specific range from among a plurality of expression selection models is used to select an expression sample corresponding to the one or more notes within the specific range from among the plurality of expression samples representing voice, in order to generate the characteristic transition in accordance with the transition of the characteristic of the expression sample. By means of the aspect described above, it is possible to select the appropriate expression sample corresponding to the situation of one or more notes by means of the expression selection model. The expression selection model is a classification model obtained by carrying out machine-learning by associating the pronunciation style and the context with the trend of selection of the expression sample applied to the notes. The context relating to a note is the situation relating to said note, such as the pitch, intensity or duration of the note or the surrounding notes.

In one example (eighth aspect) of any one of the first to the seventh aspects, in the generation of the characteristic transition, the characteristic transition is generated in accordance with an adjustment parameter set in accordance with the user's instruction. By means of the aspect described above, it is possible to generate various characteristic transitions in accordance with the adjustment parameter set in accordance with the user's instruction.

In one example (ninth aspect) of any one of the first to the eighth aspects, a voice signal representing a synthesized voice whose characteristic changes following the characteristic transition is generated. By means of the aspect described above, it is possible to generate a voice signal of the synthesized voice reflecting the characteristic transition within the specific range while reducing the workload of the user specifying the pronunciation style of each note.

In one example (tenth aspect) of the ninth aspect, in the generation of the voice signal, the voice signal representing the synthesized voice having a tone selected from among a plurality of tones in accordance with the user's instruction, is generated. By means of the aspect described above, it is possible to generate synthesized voice having various tones.

One aspect of the present disclosure can also be realized by an information processing device that executes the information processing method of each aspect as exemplified above or by a program that causes a computer to execute the information processing method of each aspect as exemplified above.

What is claimed is:

1. An information processing method realized by a computer, comprising:

independently applying a pronunciation style with regard to each of a plurality of specific ranges of a musical piece, the specific ranges being defined in the musical piece on a time axis, each of the specific ranges including a plurality of notes of the musical piece;

arranging one or more notes in accordance with an instruction from a user within a specific range for which a pronunciation style has been applied; and generating a characteristic transition, which is a transition of acoustic characteristics of voice that pronounces the one or more notes within the specific range in the pronunciation style that has been applied to the specific range.

2. The information processing method according to claim 1, further comprising displaying the one or more notes within the specific range and the characteristic transition within the specific range within a musical score area in which the time axis is set.

3. The information processing method according to claim 1, wherein in the generating of the characteristic transition, the characteristic transition of the specific range is changed each time of editing of the one or more notes within the specific range.

4. The information processing method according to claim 1, wherein the one or more notes include a first note and a second note, and the generating of the characteristic transition is performed such that a portion of the characteristic transition corresponding to the first note is different between the characteristic transition in a first state in which the first note is set within the specific range, and the characteristic transition in a second state in which the second note has been added to the specific range in the first state.

5. The information processing method according to claim 1, wherein the generation of the characteristic transition is performed by using a transition estimation model corresponding to the pronunciation style that has been applied to the specific range from among a plurality of transition estimation models corresponding to different pronunciation styles.

6. The information processing method according to claim 1, wherein the generation of the characteristic transition is performed in accordance with a transition of characteristic of an expression sample corresponding to the one or more notes within the specific range from among a plurality of expression samples representing voices.

7. The information processing method according to claim 1, wherein in the generation of the characteristic transition, an expression sample corresponding to the one or more notes within the specific range is selected from among a plurality of expression samples representing voices by using an expression selection model corresponding to the pronunciation style for that has been applied to the specific range from among a plurality of expression selection models, in order to generate the characteristic transition in accordance with a transition of characteristic of the expression sample.

8. The information processing method according to claim 1, wherein the generation of the characteristic transition is performed in accordance with an adjustment parameter that is set in accordance with the user's instruction.

9. An information processing device comprising:

an electronic controller including at least one processor, the electronic controller being configured to execute a plurality of modules including a range setting module that independently applies a pronunciation style with regard to each of a plurality of specific ranges of a musical piece, the specific ranges being defined in the musical piece on a time axis, each of the specific ranges including a plurality of notes of the musical piece, a note processing module that arranges one or more notes in accordance with an instruction from a user within a specific range for which a pronunciation style has been applied, and a transition generation module that generates a characteristic transition, which is a transition of acoustic characteristics of voice that pronounces the one or more notes within the specific range in the pronunciation style that has been applied to the specific range.

10. The information processing device according to claim 9, wherein the electronic controller is configured to further execute a display control module that displays the one or more notes within the specific range and the characteristic transition within the specific range within a musical score area in which the time axis is set.

11. The information processing device according to claim 9, wherein the transition generation module changes the characteristic transition of the specific range each time of editing of the one or more notes within the specific range.

12. The information processing device according to claim 9, wherein the one or more notes include a first note and a second note, and the transition generation module generates the characteristic transition such that a portion of the characteristic transition corresponding to the first note is different between the characteristic transition in a first state in which the first note is set within the specific range, and the characteristic transition in a second state in which the second note has been added to the specific range in the first state.

13. The information processing device according to claim 9, wherein the transition generation module uses a transition estimation model corresponding to the pronunciation style that has been applied to the specific range from among a plurality of transition estimation models corresponding to different pronunciation styles to generate the characteristic transition.

14. The information processing device according to claim 9, wherein the transition generation module generates the characteristic transition in accordance with a transition of characteristic of an expression sample corresponding to the one or more notes within the specific range from among a plurality of expression samples representing voice.

15. The information processing device according to claim 9, wherein the transition generation module selects an expression sample corresponding to the one or more notes within the specific range from among a plurality of expression samples representing voices by using an expression selection model corresponding to the pronunciation style that has been applied to the specific range from among a plurality of expression selection models, in order to generate the characteristic transition in accordance with a transition of characteristic of the expression sample.

16. The information processing device according to claim 9, wherein the transition generation module generates the characteristic transition in accordance with an adjustment parameter that is set in accordance with the user's instruction.

17. A non-transitory computer-readable medium storing a program that causes a computer to execute a process, the process comprising:

independently applying a pronunciation style with regard to each of a plurality of specific ranges of a musical piece, the specific ranges being defined in the musical piece on a time axis, each of the specific ranges including a plurality of notes of the musical piece;

arranging a note in accordance with an instruction from a user within a specific range for which a pronunciation style has been applied; and generating a characteristic transition, which is a transition of acoustic characteristics of voice that pronounces the note within the specific range in the pronunciation style that has been applied to the specific range.

* * * * *